United States Patent
Wang et al.

(10) Patent No.: US 10,757,203 B2
(45) Date of Patent: Aug. 25, 2020

(54) METHOD TO ENRICH THE BROWSER COOKIES' ATTRIBUTES BY GRAPH PROPAGATION

(71) Applicant: Yahoo Holdings, Inc., Sunnyvale, CA (US)

(72) Inventors: Liang Wang, Santa Clara, CA (US); Kuang-chih Lee, Union City, CA (US); Quan Lu, San Diego, CA (US)

(73) Assignee: Oath Inc., New York, NY (US)

( * ) Notice: Subject to any disclaimer, the term of this patent is extended or adjusted under 35 U.S.C. 154(b) by 889 days.

(21) Appl. No.: 15/186,019

(22) Filed: Jun. 17, 2016

(65) Prior Publication Data
US 2017/0366626 A1    Dec. 21, 2017

(51) Int. Cl.
*H04L 29/08* (2006.01)
*H04L 29/06* (2006.01)

(52) U.S. Cl.
CPC .......... *H04L 67/22* (2013.01); *H04L 67/025* (2013.01); *H04L 67/146* (2013.01); *H04L 67/306* (2013.01)

(58) Field of Classification Search
CPC ..... H04L 67/22; H04L 67/306; H04L 67/025; H04L 67/146; H04L 67/10; H04L 45/00; G06F 9/45558; G06F 2009/45595; G06F 2009/45591; G06F 709/224
See application file for complete search history.

(56) References Cited

U.S. PATENT DOCUMENTS

| | | | | |
|---|---|---|---|---|
| 10,019,731 B1* | 7/2018 | Wu | .................... | G06Q 30/0246 |
| 10,108,817 B2* | 10/2018 | Riva | ..................... | H04L 67/306 |
| 10,147,104 B1* | 12/2018 | Gregory | ............. | G06Q 30/0256 |
| 2002/0010625 A1* | 1/2002 | Smith | ................ | G06Q 30/0253 705/14.52 |
| 2008/0140765 A1* | 6/2008 | Kelaita | ................... | H04L 67/20 709/203 |
| 2010/0268830 A1* | 10/2010 | McKee | ................... | G06Q 10/10 709/228 |
| 2010/0312877 A1* | 12/2010 | Xie | ..................... | H04L 63/1408 709/224 |
| 2011/0082824 A1* | 4/2011 | Allison | ................ | G06Q 10/063 706/20 |
| 2012/0324027 A1* | 12/2012 | Vaynblat | ................ | G06Q 50/01 709/206 |
| 2013/0007865 A1* | 1/2013 | Krishnamurthy | ....... | H04L 63/08 726/7 |
| 2013/0124309 A1* | 5/2013 | Traasdahl | .......... | G06Q 30/0241 705/14.49 |
| 2013/0151527 A1* | 6/2013 | Bruich | ...................... | G06F 7/24 707/737 |
| 2013/0212188 A1* | 8/2013 | Duterque | ............ | G06Q 30/0201 709/206 |
| 2013/0346841 A1* | 12/2013 | Ahmed | ................... | H04L 67/22 715/208 |
| 2014/0074525 A1* | 3/2014 | Boston | ................. | G06Q 10/063 705/7.11 |
| 2014/0136333 A1* | 5/2014 | Shoshitaishvili | ....... | H04L 67/22 705/14.66 |

(Continued)

*Primary Examiner* — Hitesh Patel
*Assistant Examiner* — Clifton Houston
(74) *Attorney, Agent, or Firm* — Cooper Legal Group, LLC

(57) ABSTRACT

Systems, methods, and apparatuses are disclosed for generating mapping data structures based on predicted relationships across tracking data obtained from tracking online browsing histories of users to a network of websites.

20 Claims, 8 Drawing Sheets

(56) References Cited

U.S. PATENT DOCUMENTS

| | | | | |
|---|---|---|---|---|
| 2014/0149577 | A1* | 5/2014 | Monighetti | H04L 69/22 709/224 |
| 2014/0337513 | A1* | 11/2014 | Amalapurapu | H04L 67/00 709/224 |
| 2015/0178769 | A1* | 6/2015 | Mirisola | G06Q 30/0246 705/14.45 |
| 2015/0223051 | A1* | 8/2015 | Nadgir | H04W 8/186 455/435.1 |
| 2015/0242906 | A1* | 8/2015 | Liu | G06O 30/0275 705/14.71 |
| 2015/0269488 | A1* | 9/2015 | Galai | H04L 67/22 706/11 |
| 2015/0341453 | A1* | 11/2015 | Miller | H04W 4/21 709/204 |
| 2015/0370814 | A1* | 12/2015 | Liodden | G06F 16/958 707/738 |
| 2017/0011446 | A1* | 1/2017 | Reinsberg | G06Q 30/0631 |
| 2017/0214756 | A1* | 7/2017 | Lipka | H04L 67/22 |
| 2017/0287002 | A1* | 10/2017 | Bakhtiari | G06Q 30/0255 |

* cited by examiner

501

| Grid User Profile (GUP) 1 • Users in Month 1 ||
|---|---|
| UID 1 | User Profile 1 |
| UID 3 | User Profile 3 |
| UID 7 | User Profile 7 |

502

| Grid User Profile (GUP) 2 • Users in Month 2 ||
|---|---|
| UID 1 | User Profile 1 |
| UID 3 | User Profile 3 |
| UID 7 | User Profile 7 |
| UID 8 | User Profile 8 |
| UID 9 | User Profile 9 |

Figure 5

METHOD TO ENRICH THE BROWSER COOKIES' ATTRIBUTES BY GRAPH PROPAGATION

BACKGROUND

User information describing a user's browsing history on websites that are connected to a communications network (e.g., the Internet) may be gathered, stored, and analyzed. The user information may be gathered by the visited websites, where the user may be identified based on tracking data received from a browser application running on a user's computing device accessing the website. The user information may further be referenced to implement further goals involving the user within the communications network.

However, without a dedicated data structure that allows a computing device to track users and user information across different websites, different website browsers accessing the websites, and different computing devices that are running the website browsers, the gathered user information may not be a complete representation of the user's online browsing history.

BRIEF DESCRIPTION OF THE DRAWINGS

FIG. 5 shows exemplary tables that identify groups of users sharing a common attribute, according to some embodiments.

DETAILED DESCRIPTION

Figure 1:
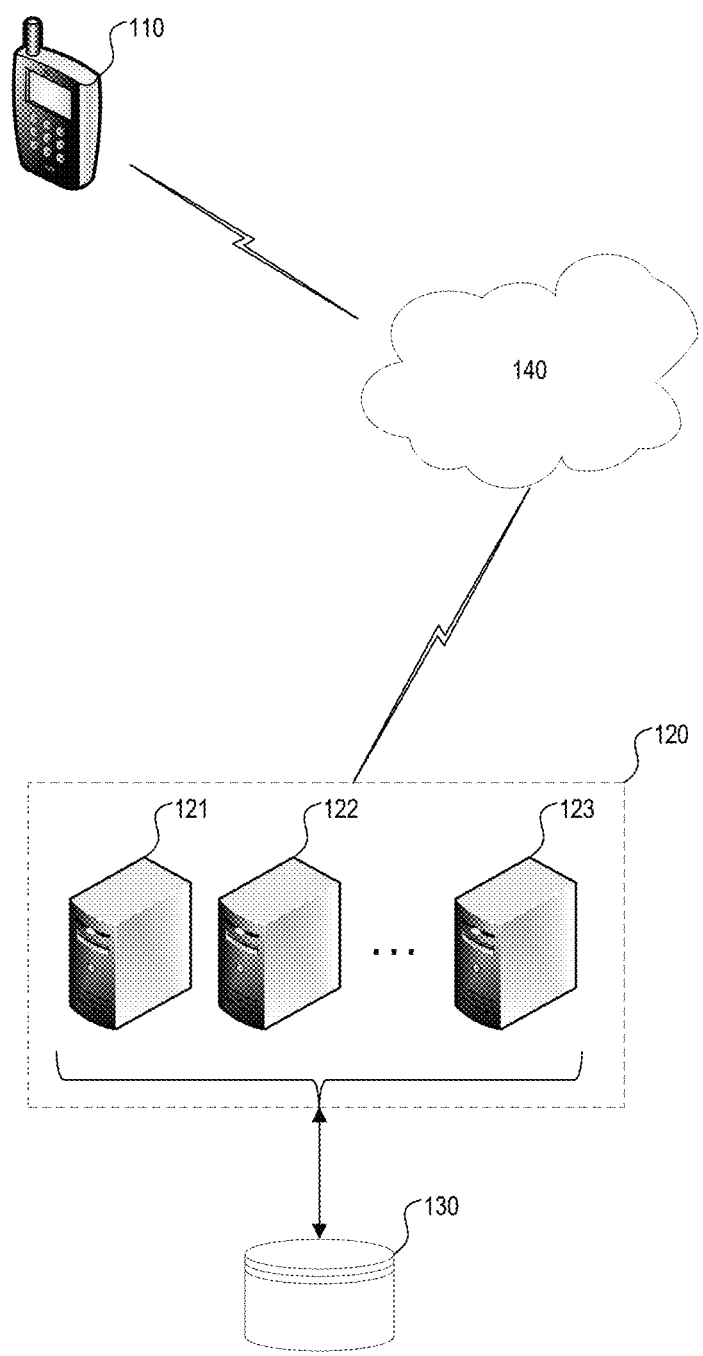
FIG. 1 shows a schematic diagram of an exemplary network.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

With the development of new and improved data structures, data organization strategies, and data analysis techniques, a user may operate their mobile computing devices to access more information every day. For example, users may control a web browser application running on their mobile device, or other computing device, to access a website and access information presented on the website.

In addition to the information presented to all users on websites, the websites may be configured to target information to specific users based on user information gathered on the specific user. The gathered user information may include the user's previously tracked browsing history on the website, where the user information may be stored by the website as part of a user profile.

To identify the user accessing the website, the web browser application may transmit tracking data identifying at least one of the user, computing device, or web browser application along with an access request to the website. Upon receiving the tracking data, the website may then extract identifying information that may be matched to a user profile being maintained by the website to obtain information on the user. This way, the website may generate more accurate targeted information to present to the user while the user interacts on the website. The targeted information may be a targeted advertisement or other online content that the website determines is relevant to the user based on an analysis of the information included in the user profile. When tracking data is not received from the web browser application, the website may transmit a request to the web browser application for the web browser to generate the tracking data and transmit the generated tracking data back to the website.

The tracking data may be, for example, a browser cookie type of data structure (hereinafter "bcookie"). The tracking data may, for example, include one or more of the following information: a value component, a name component, information identifying the website that caused the tracking data to be created, web browser identification information, computing device identification information, user identification information, and an expiration date for the tracking data. According to some embodiments, the tracking data may include a domain option that identifies a domain of websites the tracking data may be applied and/or accessed. For example, Yahoo! includes a large network of different websites under its name.yahoo.com domain (e.g., finance.yahoo.com, sports.yahoo.com) and other websites under its umbrella that don't necessarily follow the name.yahoo.com domain (e.g., flickr.com, tumblr.com). For such a network of related websites, a single tracking data may be generated to match up to a common user profile that may be referenced by one or more of the related websites. In addition or alternatively, each website in the network of related websites may have its own tracking data and matching user profile that may be accessible by each of the other websites in the network of related websites.

The tracking data may be initially created by a web browser running on the user's computing device in response to receiving instructions for creating the tracking data from a website. The tracking data may be stored on a memory of the user's computing device to be accessible by the web browser. When the tracking data includes expiration information, the web browser having created the tracking data may be responsible for deleting the tracking data according to its expiration information. So as long as the tracking data is within its expiration date, the tracking data may be accessed by the web browser from the memory and transmitted to the website for each web browsing session where the corresponding website is accessed by the web browser.

By receiving the tracking data from the web browser, websites are able to recognize each instance the website is accessed by the web browser, which in turn may be interpreted to be representative of the user's online browsing history. The website may then record a browsing history file describing the user's interactions on the website based on the received tracking data from the web browser. In particular, the browsing history file may describe the user's online shopping history that identifies amount spend on a website, items bought on a website, number of items bought per transaction on a website, whether the user was sent to the website by clicking on an online advertisement, online coupons used for a transaction, and other online shopping history information. The browsing history file may be stored on a website server memory along with the tracking data, such that the browsing history file may be identified according to the corresponding tracking data. Then for each subsequent web browsing event where the web browser accesses the website, the website may track the user's interactions on the website into the same browser history file with the corresponding tracking data. The browser history file may be included as part of a user profile created by the website to include, learn, and track the user's attributes as the user accesses the website.

Having access to a user's browsing history file allows a website to avoid a cold start situation where the web site is presented to the user without any information on the user's previous browsing interactions with the website. When the website is able to identify a browsing history file corresponding to the user based on tracking data received from the web browser accessing the website, the website may be able to personalize the website experience for user. For example, login fields found on the website may be prepopulated with the user's login information included in the browsing history file, search results may be presented to the user with related advertisements that have been selected based on purchasing habits included in the browsing history file, and interactive content may be presented on the website based on information included in the browsing history file. This demonstrates how the browser history file may be referenced by the website to create a more personalized user experience. However, when tracking data is not available, or when tracking data is determined to be unreliable, the website will conduct a cold start where it is not able to offer such personalized features to the user accessing the website.

When the user's computing device has installed multiple different web browsers, the same website may cause different tracking data to be generated for each of the different web browsers. For example, when a first web browser accesses a website, the website may control the first web browser to generate first tracking data associated with the first web browser. Then when a second web browser accesses the same website, the website may control the second web browser to generate second tracking data associated with the second web browser. Similarly, the user may access websites from different computing devices using the same or different web browsers, which may also result in different tracking data being created for the same user.

So although the creation, storage, and sharing of tracking data offers websites the potential to track user website browsing activities, with all the different scenarios under which different tracking data may be created for the same user, websites that do not have access to other user profiles that may have been created for the same user are not able to maximize all the existing user browsing activity information on the users. For example, when the user accesses the same website from two different web browsers or from two different computing devices, two different tracking data may be created. Subsequently, two different browsing history files may be created by the website for the same user. Therefore, there is a need for a data structure that collaborates browsing history files created by different websites that are predicted to correspond to a common user.

Obtaining access to user profile information allows a website to generate and/or present online content tailored to specific users. Previous website systems were limited to obtaining access to only the user profile that matched to a single tracking data, and thus only had access to a user profile that described the user's online browsing history on a particular website when access from a particular web browser application or computing device. The present disclosure describes a website system having access to user profiles created from different websites and/or created from the user's operation of different web browser applications and/or computing devices. Therefore, the present website system has access to the user's online browsing history across multiple different platforms. With the additional user profile information, the website system may generate and/or present tailored online content based on a larger set of user profile information than when the website system only had access to user profile information from the single website.

However, as the website system's reach grows to access user profile information from a larger set of related, and in some embodiments unrelated, websites, questions regarding the reliability of the user profile information gathered from the different websites may arise. Therefore, the present website system described by this disclose is configured to analyze tracking data and assistant identifiers, and generate a first mapping data structure that describes the relationship between different tracking data. The website system described herein is also configured to generate a second mapping data structure that defines a probability that different tracking data, and accordingly, relation different user profiles, are related based on the relationships between the different tracking data described by the first mapping data structure.

FIG. 1 illustrates a schematic diagram of an exemplary network system 100. The network system 100 provides a platform for gathering tracking data, generating browsing history files based on tracking data, generating a first mapping data structure that describes the relationship between different tracking data, and generating a second mapping data structure that defines a probability that different tracking data are related based on the relationships between the different tracking data based on the first mapping data structure according to predictive logic, as described in more detail herein.

The network system 100 includes a user device 110 configured to communicate with a network of website servers 120 through a network 140. The network of website servers 120 is shown to include a first website server 121, a second website server 122, a third website server 123, where each of the first website server 121, the second website server 122, and the third website server 123 are configured to host their own respective websites that may be accessible by the user device 110. Website servers that are included in the network of website servers 120 may host a family of websites that belong to a common domain (e.g., name.yahoo.com), and/or websites that are owned by a common entity (e.g., Yahoo!), and/or websites that are authorized to share user information.

Due to the common relationship shared amongst the website servers included in the network of website servers 120, one or more of the website servers may have permission to access a common database 130. For example, each of the first website server 121, the second website server 122, and the third website server 123 are shown to have access to the common database 130 to store information onto the common database 130, retrieve information from the common database 130, and receive information from the common database 130. The information stored on the common database 130 may include user profiles describing user attributes of users that have accessed websites hosted by the website servers included in the network of website servers 120. User attributes may describe a user's name, address, telephone number, email, computing device identification, date of birth, or other information for identifying a user. The user attributes may also describe a user's online shopping habits or online web browsing history.

Information shared between the components of the network system 100 may be shared through the network 140 (e.g., the Internet). For example, a user operating user device 110 may control a web browser application running on the user device 110 to transmit a viewing request to the first website server 121 for viewing content provided on a first website hosted by the first website server 121. In turn, the first website server 121 may transmit a request back to the user device 110 to generate tracking data. If tracking data corresponding to the first website was previously generated and stored on the user device 110, the web browser application may control the user device 110 to transmit the existing tracking data to the first website server 121 along with the viewing request. In addition, the web browsing application may cause the user device 110 to transmit device identification information such as, for example, an IP address, MAC address, or other identification information for the user device 110. According to embodiments where the website hosted by the first website server 121 includes a login feature allowing the user to log into the website with user identification information (e.g., user name, password, address, email address, phone number, and/or other user identifying assistant identifier), the website may record a correlation between the user identifying assistant identifier and the tracking data received from the user device 110.

In the network system 100, user device 110 is coupled for communication with any one of the first website server 121, the second website server 122, the third website server 123, or other website server included in the network of website servers 120, through network 140. For example, the user may operate a web browser running on the user device 110 to access a website, documents, or other web-based information hosted on, the first website server 121 or other website server included in the network of website servers 120. The web-based information hosted on the first website server 121 may be stored directly on a memory of the first website server 121, or may be stored on the common database 130 accessible by the first website server 121 and the other website servers included in the network of website servers 120. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided. Accordingly, the first website server 121 may be coupled to the common database 130 either directly or through network 140. According to some embodiments, the common database 130 may be included as part of the first website server 121.

User device 110 may be a computing device configured to allow a user to connect to network 140. User device 110 may provide an interface for requesting/accessing/viewing web-based information made available by, for example, the first website server 121. In addition, user device 110 may provide an interface for accessing/controlling the first website server 121. User device 110 may also be referred to as a client device and may include a computing device capable of sending or receiving signals, such as via a wired or a wireless network (e.g. the network 140, which may be the Internet). A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example The user device 110 may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. The user device 110 may include or may execute a variety of operating systems, including a personal computer operating system, such as a Windows, iOS or Linux, or a mobile operating system, such as iOS, Android, or Windows Mobile, or the like. Further, the user device 110 may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. The user device 110 may also include or execute an application to communicate content, such as, for example, textual content, multimedia content, or the like. The user device 110 may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

With respect to network 140, network 140 may couple devices so that communications may be exchanged, such as between the first website server 121 and the user device 110, or other types of devices, including between wireless devices coupled via a wireless network, for example. Network 140 may also include mass storage, such as network attached storage (NAS), a storage area network (SAN), or other forms of computer or machine readable media, for example. Network 140 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within the larger network 140. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to network 140, such as via a telephone line or link, for example.

Network 140 may include a wireless network configured to couple the user device 110 with other client devices coupled to the wireless network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, network 140 may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within network 140, or the like.

Signal packets communicated via network 140, which may include a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of network 140, such as, for example, to one or more sites employing a local network address. A signal packet may, for example, be communicated over the Internet from a user site via an access node coupled to the Internet. Likewise, a signal packet may be forwarded via network nodes to a target site coupled to network 140 via a network access node, for example. A signal packet communicated via the Internet may, for example, be routed via a path of gateways, servers, etc. that may route the signal packet in accordance with a target address and availability of a network path to the target address.

Network 140 may also include a "content delivery network" or "content distribution network" (CDN), where the CDN generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Network 140 may also include a peer-to-peer (or P2P) network, where the P2P network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 2:
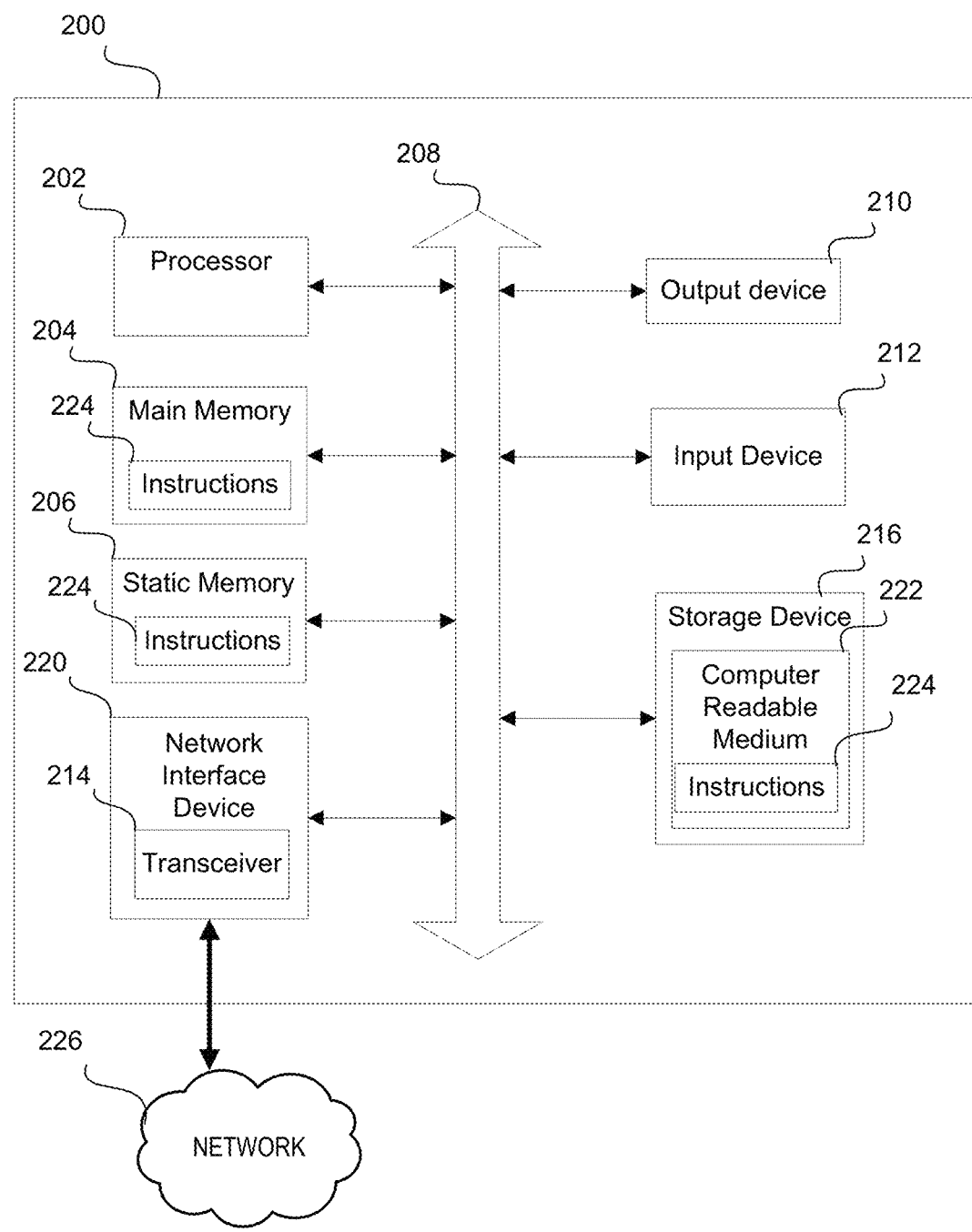
FIG. 2 shows a block diagram of exemplary computer architecture for one or more components included in the exemplary network illustrated in FIG. 1.

FIG. 2 illustrates exemplary computer architecture for computer 200. Embodiments of computer 200, including embodiments that include additional components and embodiments including fewer components than described, may be representative of any one or more of the devices illustrated in FIG. 1.

Computer 200 includes a network interface device 220 that enables communication with other computers via a network 226, where network 226 may be represented by network 140 in FIG. 1. The computer 200 may include a processor 202, a main memory 204, a static memory 206, the network interface device 220, an output device 210 (e.g., a display or speaker), an input device 212, and a storage device 216, all connected via a bus 208.

The processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 202 executes instructions and includes portions of the computer 200 that control the operation of the entire computer 200. The processor 202 may also represent a controller that organizes data and program storage in memory and transfers data and other information between the various parts of the computer 200.

The processor 202 is configured to receive input data and/or user commands from the input device 212. The input device 212 may be a keyboard, mouse or other pointing device, trackball, scroll, button, touchpad, touch screen, keypad, microphone, speech recognition device, video recognition device, or any other appropriate mechanism for the user to input data to the computer 200 and control operation of the computer 200 to implement the features described herein. Although only one input device 212 is shown, in another embodiment any number and type of input devices may be included. For example, input device 212 may include an accelerometer, a gyroscope, and a global positioning system (GPS) transceiver.

The processor 202 may also communicate with other computers via the network 226 to receive instructions 224, where the processor may control the storage of such instructions 224 into any one or more of the main memory 204, such as random access memory (RAM), static memory 206, such as read only memory (ROM), and the storage device 216. The processor 202 may then read and execute the instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that may be executed by the processor 202 to implement the features described herein.

Although computer 200 is shown to contain only a single processor 202 and a single bus 208, the disclosed embodiment applies equally to computers that may have multiple processors and to computers that may have multiple busses with some or all performing different functions in different ways.

The storage device 216 represents one or more mechanisms for storing data. For example, the storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although the computer 200 is drawn to contain the storage device 216, it may be distributed across other computers, for example on a server.

The storage device 216 may include a controller (not shown) and a computer readable medium 222 having instructions 224 capable of being executed by the processor 202 to carry out processes described herein. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 216 may also contain additional software and data (not shown), which is not necessary to understand the features described herein.

Output device 210 is configured to present information to the user. For example, the output device 210 may be a display such as a liquid crystal display (LCD), a gas or plasma-based flat-panel display, or a traditional cathode-ray tube (CRT) display or other well-known type of display in the art of computer hardware. Accordingly, in some embodiments the output device 210 displays a user interface. In other embodiments, the output device 210 may be a speaker configured to output audible information to the user. In still other embodiments, any combination of output devices may be represented by the output device 210.

Network interface device 220 provides the computer 200 with connectivity to the network 226 through any suitable communications protocol. The network interface device 220 sends and/or receives data from the network 226 via a wireless or wired transceiver 214. The transceiver 214 may be a cellular frequency, radio frequency (RF), infrared (IR) or any of a number of known wireless or wired transmission systems capable of communicating with a network 226 or other computer device having some or all of the features of computer 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller). The network 226 may be a representation of network 140 shown in FIG. 1. Alternatively, network 226 may be another network coupled to, for example, the network 140 shown in FIG. 1.

Computer 200 may be implemented using any suitable hardware and/or software, such as a personal computer or other electronic computing device. In addition to the various types of wearable devices described herein, computer 200 may also be a portable computer, laptop, tablet or notebook computer, PDA, pocket computer, appliance, telephone, or mainframe computer.

Figure 3:
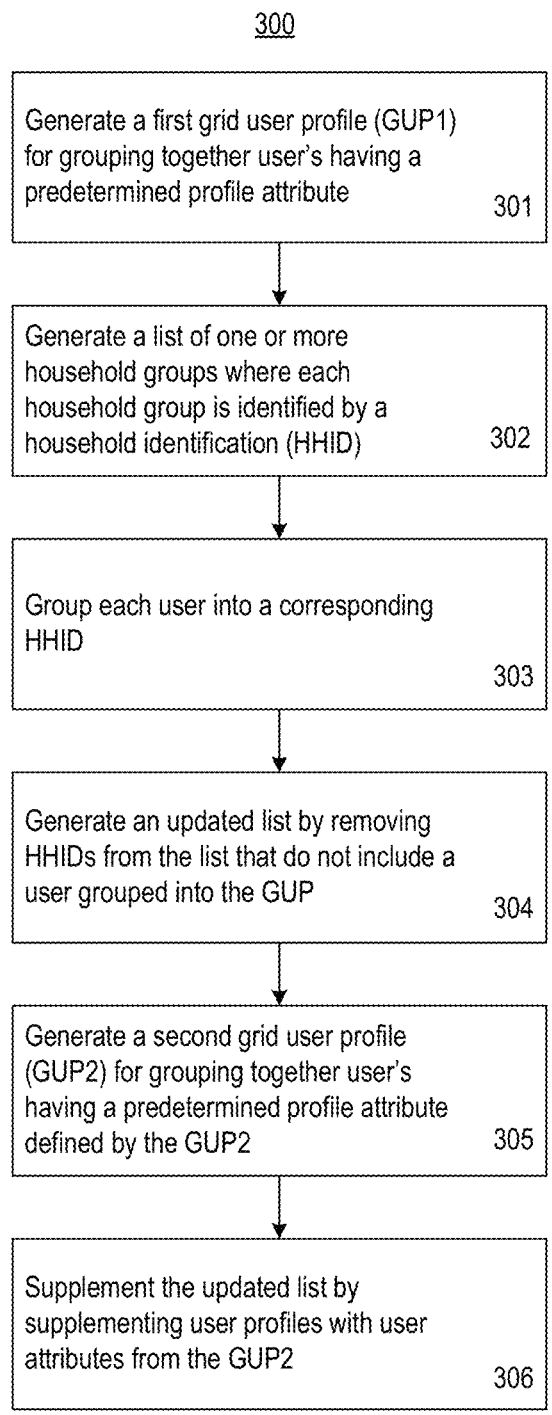
FIG. 3 shows a flow diagram of logic describing a process for gathering user information and updating a user profile based on the gathered user information, according to some embodiments.

FIG. 3 illustrates a flow diagram of logic 300 describing an exemplary process for generating a list of household groups, where each household group identifies users of a website, or network of websites, that have been determined to belong to a common household physical address. The flow diagram of logic 300 further describes an exemplary process for updating the list based on user profile attributes. The process described by the flow diagram of logic 300 may be implemented by a list generating tool included on one or more of website servers that are included in the network of website servers 120. The list generating tool may be comprised of software, hardware, and/or circuitry configured to implement the process described by flow diagram of logic 300.

Initially, at 301 the list generating tool may generate a first grid user profile (GUP1) that groups together user's having a predetermined user profile attribute. The list generating tool may access a database of user profiles related to users that have visited a websites hosted by a website server included in the network of website servers 120. The database of user profiles may be stored and accessed from, for example, the common database 130. When the predetermined user profile attribute calls for the list generating tool to group all users that have visited a particular website hosted by a website server included in the network of website servers 120 within a first set time period (e.g., visited last month in October), the list generating tool may parse the database of user profiles to determine which users visited the particular website during the first set time period.

The list generating tool may then group the users determined to have visited the particular website during the first set time period into GUP1.

FIG. 5 shows an exemplary first table 501 representative of GUP1. First table 501 shows user 1 (UID 1) having user profile 1, user 3 (UID 3) having user profile 3, and user 7 (UID 7) having user profile 7, being grouped into GUP1 for having visited the particular website during the first set time period.

Referring back to the flow diagram of logic 300, at 302 the list generating tool may generate a list that includes one or more household groups, where each household group corresponds to a unique physical address (e.g., a household) or other identifiable physical location. Each household group may include one or more Bcookies determined by the list generating tool to belong to users that reside, or otherwise be associated with, the same unique physical address or other identifiable physical location (e.g., household) based on a prediction from analyzing user profile information. Each household group may be assigned a household identification (HHID), where each HHID is mapped to include a number of corresponding user identifications (UID) determined to reside or otherwise be associated with the unique physical address corresponding to the HHID.

Figure 6:
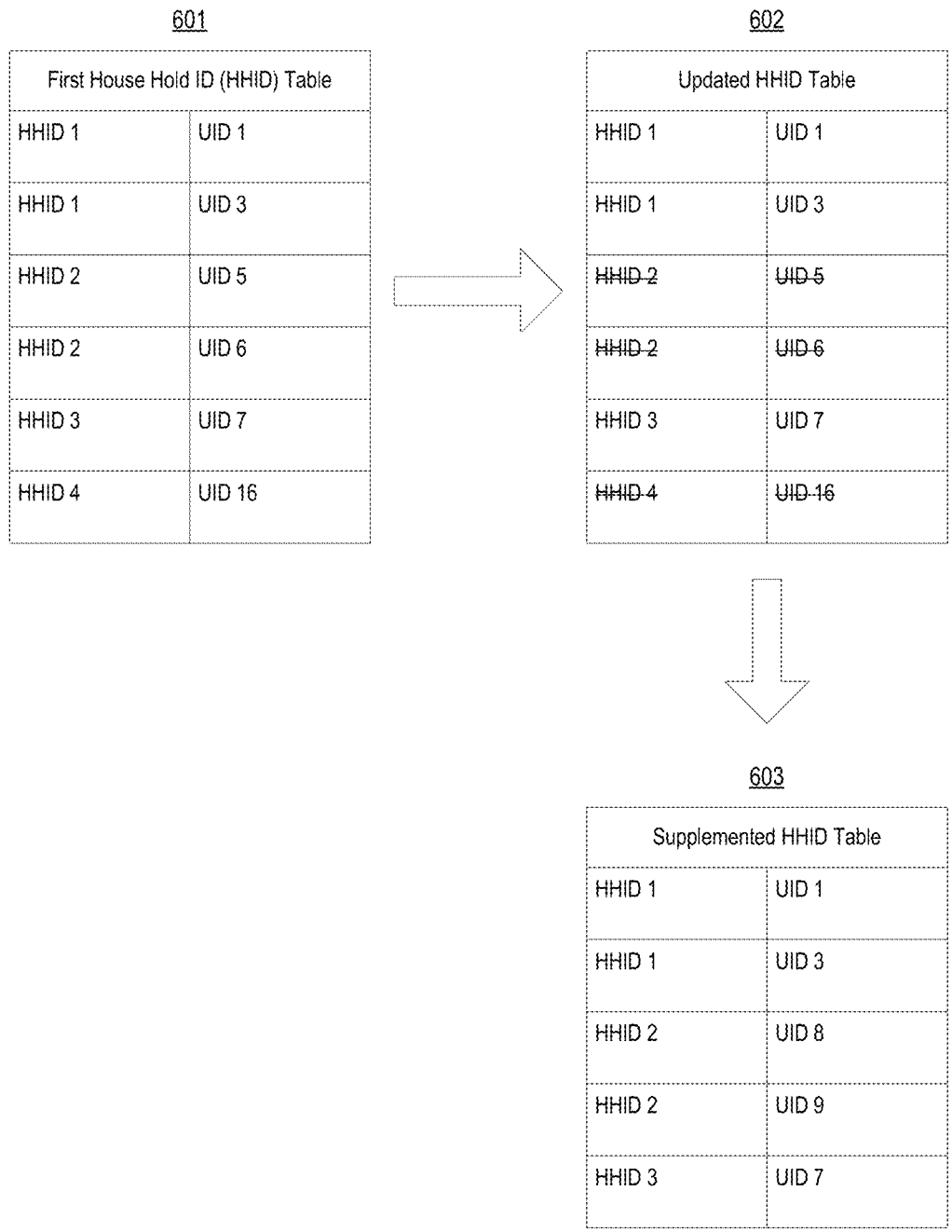
FIG. 6 shows exemplary tables that describe changes to household groups and their included users based on updated user attribute information, according to some embodiments.

At 303, the list generating tool may group users into their corresponding HHID based on user profile information that associates the users to the unique physical address or other identifiable physical location of the corresponding HHID. FIG. 6 illustrates an exemplary First HHID Table 601 that the list generating tool may have generated. First HHID Table 601 identifies HHID 1 including user 1 (UID 1) and user 3 (UID 3), HHID 2 including user 5 (UID 5) and user 6 (UID 6), HHID 3 including user 7 (UID 7), and HHID 4 including user 16 (UID 16).

Referring back to the flow diagram of logic 300, at 304 the list generating tool may update the list of household groups by removing household groups that do not include users in GUP1. In other words, the list generating tool may update the list of household groups by removing household groups that do not include users that have visited the particular website during the set time period. FIG. 6 shows an exemplary Updated HHID Table 602, where household group 2 (HHID 2) and household group 4 (HHID 4) have been removed from the First HHID Table 601 because household group 2 (HHID 2) and household group 4 (HHID 4) do not include users that are included in GUP1.

Referring back to the flow diagram of logic 300, at 305 the list generating tool may generate a second grid user profile (GUP2) that groups together user's having a predetermined user profile attribute. When the predetermined user profile attribute calls for the list generating tool to group all users that have visited a particular website hosted by a website server included in the network of website servers 120 within a second set time period (e.g., visited current month in November), the list generating tool may parse the database of user profiles to determine which users visited the particular website during the second set time period. The list generating tool may then group the users determined to have visited the particular website during the second set time period into GUP2. The second set time period may be later (i.e., more current) than the first set time period. The GUP2 may include one or more of the same users from GUP1, which indicates those users have visited the particular website during both the first and second set time periods. The GUP2 may also include new users that were not previously included in GUP1.

FIG. 5 shows an exemplary second table 502 representative of GUP1. Second table 502 shows user 1 (UID 1) having user profile 1, user 3 (UID 3) having user profile 3, user 7 (UID 7) having user profile 7, user 8 (UID 8) having user profile 8, and user 9 (UID 9) having user profile 9, being grouped into GUP2 for having visited the particular website during the second set time period. As can be seen, user 1, user 3, and user 7 are carried over from GUP1. However, user 8 and user 9 are newly added to GUP2.

Referring back to the flow diagram of logic 300, at 306 the list generating tool may update the list of household groups by adding new users from GUP2 into their respective household group. For example, FIG. 6 shows exemplary Supplemented HHID Table 603, where household group 2 (HHID 2) has been added to account for user 8 and user 9 being included in GUP2. Household group 1 (HHID 1) and household group 3 (HHID 3) remain in the Supplemented HHID Table 603 as user 1, user 3, and user 7 are still included in GUP2.

As described above, each household group may include a collection of Bcookies determined by the list generating tool to belong to users that reside, or otherwise be associated with, the same unique physical address or other identifiable physical location (e.g., household). Thus the household group may be a unique data structure generated by the list generating tool according to the processes described by the flow diagram of logic 300. When information is requested by an application service for a particular user, a household group data structure that includes the particular user may be provided in response. The user profile information that corresponds to the Bcookies included in the household group may then be referenced to supplement the user profile information of the particular user. By supplementing the user profile information provided to the application service to include not only the requested user profile information but also the user profile information corresponding to all the Bcookies included in the same household group, the application service may have access to user profile information for users that are related, and therefore relevant, to the particular user. This may allow the application service to make a more informed decision based on all the provided user profile information.

The household group data structure may further offer a solution to a cold start scenario. For example, when a user accessing the website is identified by the website as not having a related Bcookie available (i.e., a cold start scenario), the website may determine whether the user may be identified to belong to a household group that includes other Bcookies that correspond to other users having user profiles. An assistant identifier, such as the IP Address of the user's computing device accessing the website, may be referenced by the website to determine the correct household group that the cold start user belongs to.

Figure 4:
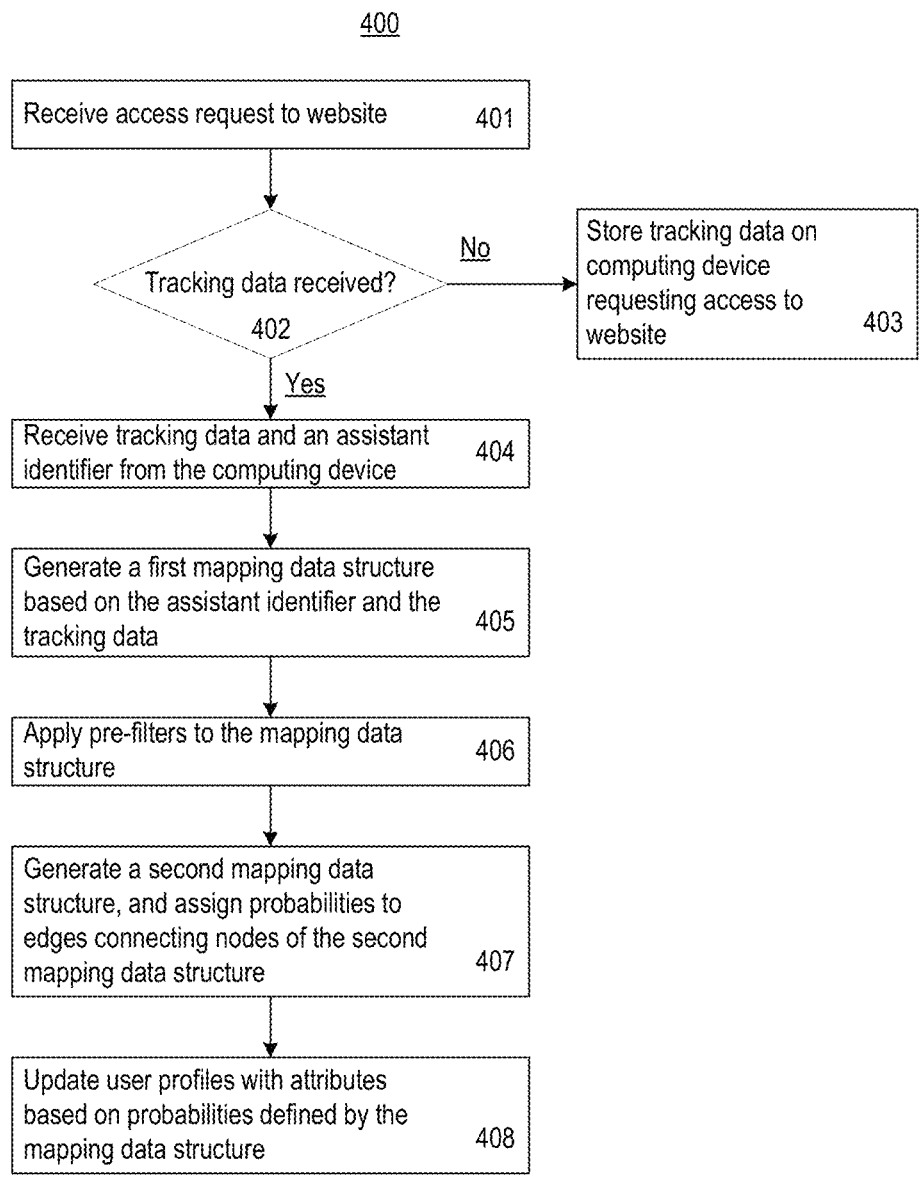
FIG. 4 shows a flow diagram of logic describing a process for generating mapping data structures, according to some embodiments.

FIG. 4 illustrates a flow diagram of logic 400 describing an exemplary process for generating mapping data structures based on tracking data and an assistant identifier received from a computing device accessing a website. The process described by the flow diagram of logic 400 may be implemented by a data structure generator included on one or more of website servers that are included in the network of website servers 120 such as, for example the first website server 121. The data structure generator may be comprised of software, hardware, and/or circuitry configured to implement the process described by flow diagram of logic 400. The assistant identifier referenced by the flow diagram of logic 400 may be any of the exemplary assistant identifiers described herein. In addition, the assistant identifier referenced by the flow diagram of logic 400 may include a related household group identified as including the Bcookie received from a user device requesting access to a website.

Initially, at 401 the data structure generator receives an access request to access a website hosted by the first website server 121, where the access request is received from, for example, user device 110. The user device 110 may be running a web browser application that generates the access request in response to a user operating the web browser application to visit the website hosted by the first website server 121.

At 402, the data structure generator determines whether tracking data (e.g., a Bcookie) stored on the user device 110 is received from the user device 110. When tracking data is not received from the user device 110 along with the access request, this may indicate that the web browser application running on the user device 110 and currently requesting access to the website, has not previously visited the website or that previously created tracking data has expired. In any case, when the data structure generator determines tracking data has not been received from the user device 110, at 403 the data structure generator may transmit instructions to the web browser application running on the user device 110 to create tracking data for the website. The tracking data may be created to include information as already described herein.

When non-expired tracking data for the website exists on the user device 110, the web browser application causes the user device 110 to transmit the tracking data along with the access request to the data structure generator running on the first website server 121. At 404, the data structure generator receives the tracking data from the user device 110. In addition to the access request and tracking data, the web browser application may cause the user device 110 to transmit an assistant identifier to the data structure generator running on the first website server 121. Therefore, at 404 the data structure generator may further receive the assistant identifier from the user device 110. The assistant identifier may be an IP address or other identifier for identifying the user device 110. In addition or alternatively, the assistant identifier may be an identifier for identifying the user. For example, when the user has already logged into the website using login credentials (e.g., login name), the user's login credentials may be received and referenced by the data structure generator as the assistant identifier. The data structure generator may select a corresponding user profile from the common database 130 by matching the received tracking data and/or assistant identifier to identification information of the corresponding user profile.

At 405, the data structure generator may generate a first mapping data structure based on the received assistant identifier and the tracking data. The first mapping data structure may include a first set of nodes representing the assistant identifier ("IP nodes), and a second set of nodes representing the tracking data ("tracking data nodes"). To obtain the first set of nodes, the data structure generator may retrieve IP address information for computing devices, including the user device 110 and other computing devices, that have accessed the website hosted on the first website server 121. The data structure generator may further obtain IP address information for computing devices that have accessed other websites that are hosted on a website server included in the network of website servers 120. The IP address information may be stored on, for example, the common database 130. Each IP address obtained by the data structure generator may be assigned a node in the first set of nodes.

To obtain the second set of nodes, the data structure generator may retrieve tracking data (e.g., Bcookies) received from computing devices, including the user device 110 and other computing devices, that have accessed the website hosted on the first website server 121. The data structure generator may further obtain tracking data received from computing devices that have accessed other websites that are hosted on a website server included in the network of website servers 120. The tracking data may be stored on, for example, the common database 130. Each tracking data obtained by the data structure generator may be assigned a node in the second set of nodes.

The data structure generator may further generate the first mapping data structure to include edges that define relationships between nodes. The relationship between the first set of nodes (e.g., IP address nodes) and the second set of nodes (e.g., tracking data nodes) may be determined based on an analysis of user profiles, grid user profiles, household groups, household identification tables, and/or other information stored on the common database 130. In particular, an edge connecting an IP node to a tracking data node may indicate that a computing device with an IP address identified by the IP node has previously visited a website identified by the tracking data node. According to some embodiments, the edge may further describe a probability that the connected nodes are related to each other.

Figure 7:
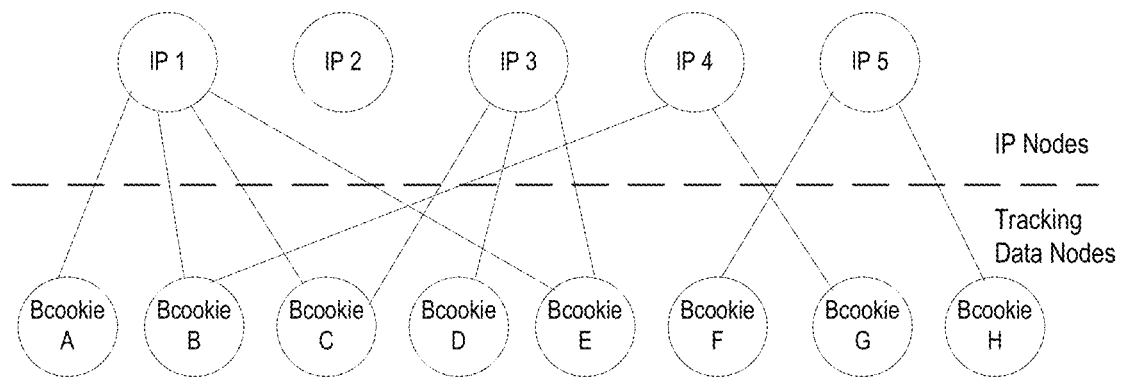
FIG. 7 shows an exemplary first mapping data structure, according to some embodiments.

FIG. 7 shows an exemplary first mapping data structure 700 that includes a first set of IP nodes representing assistant identifiers that describe IP addresses, and a second set of tracking data nodes representing Bcookies. In particular, the first mapping data structure 700 includes the following IP nodes: IP node 1, IP node 2, IP node 3, IP node 4, and IP node 5. The first mapping data structure 700 also includes the following tracking data nodes: Bcookie node A, Bcookie node B, Bcookie node C, Bcookie node D, Bcookie node E, Bcookie node F, Bcookie node G, and Bcookie node H.

The first mapping data structure 700 also includes edges between nodes, where the edges are represented by connecting lines between nodes from the first set of IP nodes and the second set of tracking data nodes. For example, IP node 1 is shown to have a relationship with Bcookie A, Bcookie, B, Bcookie C, and Bcookie E. The edge between IP node 1 and tacking data nodes Bcookie A, Bcookie, B, Bcookie C, and Bcookie E may represent that a computing device assigned an IP address identified by IP node 1 has previously accessed websites identified by Bcookie A, Bcookie, B, Bcookie C, and Bcookie E. Some nodes, such as IP node 2, may be determined not to have a relationship to any other node. This may indicate that a computing device assigned an IP address identified by IP node 2 has not previously visited, or at least not within a predetermined time period, a website identified by any of Bcookie node A, Bcookie node B, Bcookie node C, Bcookie node D, Bcookie node E, Bcookie node F, Bcookie node G, and Bcookie node H.

Referring back to the flow diagram of logic 400, at 406 the data structure generator may apply one or more pre-filters to the first mapping data structure to remove nodes that do not satisfy a rule defined by the pre-filters. For example, a pre-filter rule may call for the removal of an IP node from the first mapping data structure when the IP node is determined to have greater than a predetermined number of edges (e.g., N=100 edges) connecting the IP node to different tracking data nodes. Such a pre-filter rule may be accounting for the scenario where the IP node is assumed to belong to a public, or otherwise unreliable, computing device that cannot be trusted to be representative of the online browsing habits of a unique user, or even a unique household of users.

This assumption may be made because the computing device having the IP address represented by the IP node has been shown to have created more than the predetermined number of Bcookies. When an excess number (e.g., greater than the predetermined number of edges N) of Bcookies is found to have been created by the same computing device, this may indicate a large number of unrelated users have operated the computing device, and therefore the information obtained by tracking the browsing history of users on the computing device may not be relied upon as a representation of a unique user, or even a unique household of users. Thus, an IP node may be removed from the first mapping data structure when the IP node is determined to have greater than a predetermined number of edges (e.g., N=100 edges) connecting the IP node to different tracking data nodes. According to some embodiments, the pre-filter rule may further call for the removal of such IP nodes and all tracking data nodes that are connected to such IP nodes by an edge.

Another pre-filter rule may call for the removal of tracking data nodes that are determined to have greater than a predetermined number of edges (e.g., M=30 edges) connecting the tracking data nodes to different IP nodes. Such a pre-filter rule may be accounting for the scenario where the Bcookie is assumed to have been created by a fraudulent, or otherwise unreliable, scheme that involves an excess number of computing devices. It follows that the Bcookie cannot be trusted to be representative of the online browsing habits of a unique user, or even a unique household of users. This assumption may be made because the same Bcookie is found to have been stored/created by an excess number of computing devices. When an excess number (e.g., greater than the predetermined number of edges M) of computing devices is found to have stored/created the same Bcookie, this may indicate an unreliable scheme because a unique user, or unique household, is not likely to own and/or operate such an excess number of computing devices. Therefore, the information obtained by tracking the browsing history of users associated with such a Bcookie may not be relied upon as a representation of a unique user, or even a unique household of users. Thus, tracking data nodes may be removed from the first mapping data structure when the tracking data node is determined to have greater than a predetermined number of edges (e.g., M=30 edges) connecting the tracking data node to different IP nodes. According to some embodiments, the pre-filter rule may further call for the removal of such tracking data nodes and all IP nodes that are connected to such tracking data nodes by an edge.

Referring back to the flow diagram of logic 400, at 407 the data structure generator may generate a second mapping data structure based on the first mapping data structure. For example, the second mapping data structure may include one or more tracking data nodes selected from the remaining tracking data nodes included in the first mapping data structure. As each tracking data node in the second mapping data structure may be mapped to a user profile, as described previously, the corresponding user profile may be included for each tracking data node in the second mapping data structure.

The second mapping data structure may further include probability edges that connect the tracking data nodes included in the second mapping data structure. The probability edges included in the second mapping data structure further describes a probability that the two tracking data nodes are related to a common user and/or common household. The probability value of the probability edges included in the second mapping data structure may be based on attributes from the first mapping data structure. For example, probability edges in the second mapping data structure may indicate a higher probability that two connecting tracking data nodes relate to a common user and/or common household when the two connecting tracking data nodes are determined to relate to a higher number of the same IP nodes from the first mapping data structure. The probability edges in the second mapping data structure may also indicate a lower probability that a tracking data node in the second mapping data structure is reliable for providing online browsing history data for a common user and/or common household when the tracking data node is determined to relate to a higher number of other nodes in the first mapping data structure.

Figure 8:
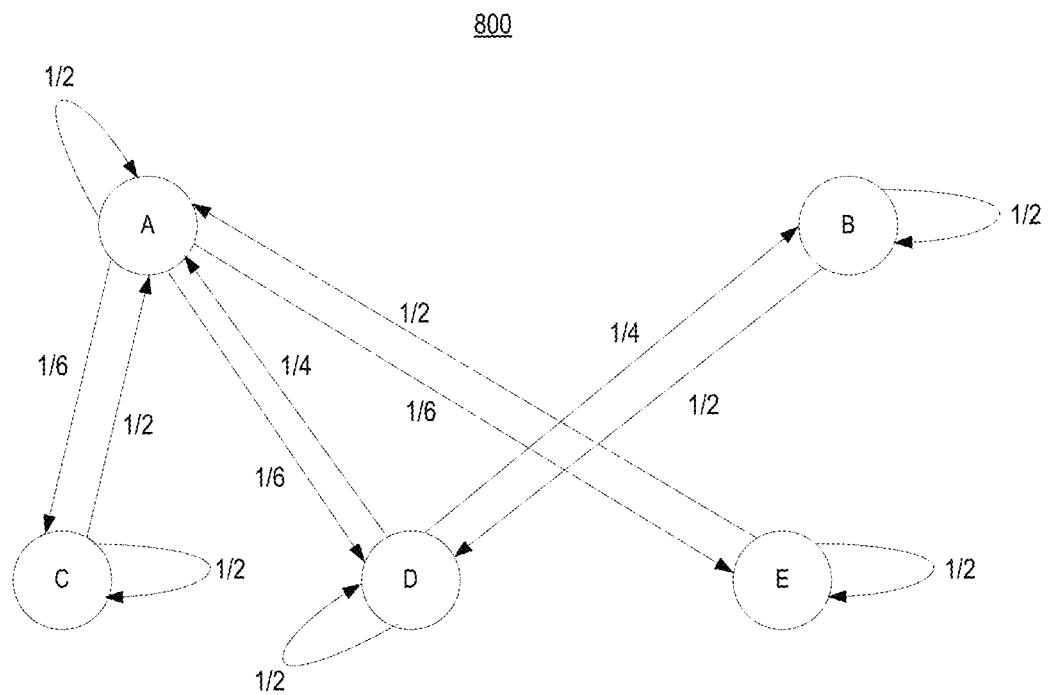
FIG. 8 shows an exemplary second mapping data structure, according to some embodiments.

FIG. 8 shows an exemplary second mapping data structure 800 that includes tracking data node A, tracking data node B, tracking data node C, tracking data node D, tracking data node E. Each of the tracking data nodes represented in the second mapping data structure 800 may correspond to a respective tracking data node represented in the first mapping data structure 700.

The second mapping data structure 800 also includes probability edges connecting the different tracking data nodes. For example, tracking data node A includes a ⅙ probability edge to tracking data node C and tracking data node E, which indicates that there is a ⅙ probability that tracking data node A is related to tracking data nodes C and E. In particular, the ⅙ probability edges connecting tracking data node A to tracking data nodes C and E may identify a probability (e.g., probability of ⅙) that a user profile corresponding to tracking data node A is related to a common user and/or common household as the user profiles corresponding to tracking nodes C and E. A reading of tracking data node A may therefore identify the user profile corresponding to tracking data node A, and also identify a ⅙ probability that the user profiles corresponding to tracking data nodes C and E also relates to the common user and/or common assistant identifier described by the user profile corresponding to tracking data node A. It follows that an application wishing to reference user profile information for the common user and/or common household corresponding to tracking data node A may reference the user profile described by tracking data node A and also have the option to reference the user profiles described by tracking data nodes C and E based on the ⅙ probability calculated by the probability edges connecting tracking data node A with tracking data nodes C and E.

The second mapping data structure 800 also includes a ½ probability edge relating back to tracking data node A itself. The ½ probability edge relating back to tracking data node A itself, may indicate a probability that tracking data node A is a reliable source for obtaining the user profile corresponding to tracking data node A.

Referring back to the flow diagram of logic 400, at 408 the data structure generator may update user profiles with attributes based on probabilities defined by the connecting probability edges. For example, the second mapping data structure 800 may be propagated according to a Markov random walk method to propagate user profile attributes along the tracking data nodes in the second mapping data structure 800. Initially, each tracking data node in the second mapping data structure 800 may be annotated with their respective user profile that may include a user's online browsing history. Then starting from an initial annotation, the second mapping data structure 800 may be propagated according to the Markov random walk method to update the profile attributes for both the tracking data node and the assistant identifier nodes. The probability edges connecting the tracking nodes and the assistant identifier nodes may be defined as the inverse of the tracking nodes'/assistant identifier nodes out-degree. It should be noted the edges between the tracking nodes and the assistant identifier nodes are bi-directional, allowing different probability in propagate in and out of the nodes. After several rounds of propagation, all of the nodes may be annotated with weighted user profile attribute items, as shown by the second mapping data structure 800 in FIG. 8. The number of propagation rounds may be set manually or by a predetermined number of rounds, or according to certain criterion when the weighted user attribute items for the tracking data nodes do not change.

The weighted mapping data structure may be provided to a website. The website may extract user profile information directly from the weighted mapping data structure, or use the Bcookie information from the weighted user profile information to access the corresponding user profile. With the weighted probabilities included in the weighted mapping data structure, the receiving website may determine whether to include additional user profiles in their analysis for generating targeted online content to a targeted user based on the probability that the additional user profile relate to the targeted user. By building the weighted mapping data structure and propagating/transmitting the attributes along the graph based on the probabilities defined on the graph edges, bcookie attributes may be enriched by the propagation methods. And because the propagation is applied to both the tracking data (bcookie) and the assistant identifiers (IP address), the assistant identifiers also get some attributes by the propagation.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is therefore intended that the foregoing detailed description be regarded as illustrative rather than limiting, and that it be understood that it is the following claims, including all equivalents, that are intended to define the spirit and scope of this disclosure.

What is claimed is:

1. A computing device comprising:
an interface configured to receive a viewing request, an assistant identifier, and tracking data from a communication device, the viewing request corresponding to a website hosted by the computing device; and
a processor configured to:
communicate with the interface to receive the viewing request, the assistant identifier, and the tracking data;
control the interface to access user profile information;
identify a plurality of computing devices that have accessed the website associated with the viewing request;
generate, based on the assistant identifier and the tracking data, a first mapping data structure including a first set of assistant identifier nodes retrieved in association with the plurality of computing devices that have accessed the website, a second set of tracking data nodes retrieved in association with the plurality of computing devices that have accessed the website, and one or more edges connecting nodes from the first set of assistant identifier nodes to nodes from the second set of tracking data nodes, wherein a first node in the first mapping data structure is not connected to one or more other nodes based on a first computing device associated with the first node being determined not to have accessed one or more websites identified by the one or more other nodes, wherein a second node in the first mapping data structure is connected to a third node based on a second computing device associated with the second node being determined to have accessed at least one or more websites identified by the third node;
generate a second mapping data structure including a set of weighted tracking data nodes and one or more probability edges connecting nodes from the set of weighted tracking data nodes based on the first mapping data structure, wherein the second mapping data structure comprises the third node connected to a fourth node with an edge indicative of a probability that the third node is related to the fourth node, wherein the probability that the third node is related to the fourth node is determined based on a determination that the third node and the fourth node are connected to one or more same nodes in the first mapping data structure;
update one or more user profiles based on the second mapping data structure;
generate online content for a user based on the one or more user profiles; and
transmit the online content to a third computing device of the user.

2. The computing device of claim 1, wherein the processor is further configured to:
apply a pre-filter to the first mapping data structure.

3. The computing device of claim 2, wherein the pre-filter includes a rule for removing assistant identifier nodes from the first set of assistant identifier nodes that are connected to more than a predetermined number of edges.

4. The computing device of claim 3, wherein the predetermined number of edges is 100.

5. The computing device of claim 2, wherein the pre-filter includes a rule for removing tracking data nodes from the second set of tracking data nodes that are connected to more than a predetermined number of edges.

6. The computing device of claim 1, wherein:
the first mapping data structure comprises a first assistant identifier node, a first tracking data node and a second tracking data node,
the first assistant identifier node is connected to the first tracking data node via a first edge based on a determination that a fourth computing device assigned a second assistant identifier represented by the first assistant identifier node has accessed a second website identified by first tracking data represented by the first tracking data node, and
the first assistant identifier node is connected to the second tracking data node via a second edge based on a determination that the fourth computing device assigned the second assistant identifier represented by the first assistant identifier node has accessed a third website identified by second tracking data represented by the second tracking data node.

7. The computing device of claim 1, wherein tracking data nodes of the second set of tracking data nodes identify a Bcookie.

8. The computing device of claim 1, wherein assistant identifier nodes of the first set of assistant identifier nodes identify an IP address corresponding to communication devices that have accessed the website hosted by the computing device and other websites included in a network of related websites that include the website hosted by the computing device.

9. The computing device of claim 1, wherein the processor is configured to access the user profile information from a database storing user profiles related to the website hosted by the computing device and other websites included in a network of related websites that include the website hosted by the computing device.

10. The computing device of claim 1, wherein a probability value for a probability edge connecting two or more nodes is proportional to an out-degree of at least one node of the two or more nodes.

11. The computing device of claim 1, wherein a probability value for a probability edge connecting nodes is proportional to a first weighted tracking node and a second weighted tracking node from the set of weighted tracking data nodes is directly proportional to a number of common assistant identifier nodes the first weighted tracking node and the second weighted tracking node are connected to in the first mapping data structure; and
wherein a second probability value for a second probability edge connecting a weighted tracking node to the weighted tracking node is set to a fixed value.

12. The computing device of claim 1, wherein the processor is further configured to:
update profile attributes of one or more nodes included in both the first mapping data structure and the second mapping data structure by propagating the profile attributes of the one or more nodes according to a random walk of the second mapping data structure.

13. A method for generating mapping data structures, the method comprising:
receiving, through an interface, a viewing request for viewing a website hosted on a computing device, an assistant identifier, and a tracking data;
controlling the interface to access user profile information stored on a database;
identifying a plurality of computing devices that have accessed the website associated with the viewing request;
generating, based on the assistant identifier and the tracking data, a first mapping data structure including a first set of assistant identifier nodes retrieved in association with the plurality of computing devices that have accessed the website, a second set of tracking data nodes retrieved in association with the plurality of computing devices that have accessed the website, and one or more edges connecting nodes from the first set of assistant identifier nodes to nodes from the second set of tracking data nodes;
generating a second mapping data structure including a set of weighted tracking data nodes and one or more probability edges connecting nodes from the set of weighted tracking data nodes based on the first mapping data structure, wherein the second mapping data structure comprises a first node connected to a second node with an edge indicative of a probability that the first node is related to the second node, wherein the probability that the first node is related to the second node is determined based on a determination that the first node and the second node are connected to one or more same nodes in the first mapping data structure;
generating one or more user profiles based on the second mapping data structure;
generating online content for a user based on the one or more user profiles; and
transmitting the online content to a second computing device of the user.

14. The method of claim 13, further comprising:
applying a pre-filter to the first mapping data structure.

15. The method of claim 14, wherein the pre-filter includes at least one of a first rule for removing assistant identifier nodes from the first set of assistant identifier nodes that are connected to more than a first predetermined number of edges, or a second rule for removing tracking data nodes from the second set of tracking data nodes that are connected to more than a second predetermined number of edges.

16. The method of claim 15, wherein the first predetermined number of edges is 100 and the second predetermined number of edges is 30.

17. The method of claim 13, wherein tracking data nodes of the second set of tracking data nodes identify atomic level user identifiers including at least one of a Bcookie or a mobile ID.

18. The method of claim 13, wherein assistant identifier nodes of the first set of assistant identifier nodes identify an IP address corresponding to communication devices that have accessed the website hosted by the computing device and other websites included in a network of related websites that include the website hosted by the computing device.

19. The method of claim 13, wherein the database stores user profiles related to the website hosted by the computing device and other websites included in a network of related websites that include the website hosted by the computing device.

20. A non-transitory computer readable medium comprising instructions that when executed by a processor perform operations comprising:

receiving, through an interface, a viewing request for viewing a website hosted on a computing device, an assistant identifier, and a tracking data;

controlling the interface to access user profile information stored on a database;

identifying a plurality of computing devices that have accessed the website associated with the viewing request;

generating, based on the assistant identifier and the tracking data, a first mapping data structure including a first set of assistant identifier nodes retrieved in association with the plurality of computing devices that have accessed the website, a second set of tracking data nodes retrieved in association with the plurality of computing devices that have accessed the website, and one or more edges connecting nodes from the first set of assistant identifier nodes to nodes from the second set of tracking data nodes;

generating a second mapping data structure including a set of weighted tracking data nodes and one or more probability edges connecting nodes from the set of weighted tracking data nodes based on the first mapping data structure, wherein the second mapping data structure comprises a first node connected to a second node with an edge indicative of a probability that the first node is related to the second node, wherein the probability that the first node is related to the second node is determined based on a determination that the first node and the second node are connected to one or more same nodes in the first mapping data structure;

generating one or more user profiles based on the second mapping data structure;

generating online content for a user based on the one or more user profiles; and transmitting the online content to a second computing device of the user.

* * * * *